US012634785B2

(12) United States Patent
Vivanco et al.

(10) Patent No.: US 12,634,785 B2
(45) Date of Patent: May 19, 2026

(54) TRAFFIC MANAGEMENT TECHNIQUES FOR HETEROGENEOUS TERRESTRIAL AND SATELLITE NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 428 days.

(21) Appl. No.: 18/470,125

(22) Filed: Sep. 19, 2023

(65) Prior Publication Data

US 2025/0097801 A1 Mar. 20, 2025

(51) Int. Cl.
*H04W 36/08* (2009.01)
*H04B 7/185* (2006.01)

(52) U.S. Cl.
CPC ...... *H04W 36/083* (2023.05); *H04B 7/18513* (2013.01); *H04B 7/18539* (2013.01); *H04B 7/18547* (2013.01)

(58) Field of Classification Search
CPC ............. H04W 36/083; H04B 7/18513; H04B 7/18539; H04B 7/18547
See application file for complete search history.

(56) References Cited

U.S. PATENT DOCUMENTS

| | | | | |
|---|---|---|---|---|
| 6,157,834 A | * | 12/2000 | Helm ................. | H04B 7/18563 455/12.1 |
| 10,972,961 B2 | * | 4/2021 | Gibbon ................... | H04L 65/80 |
| 12,494,841 B1 | * | 12/2025 | Masoomzadeh ... | H04B 7/18513 |
| 2003/0203717 A1 | * | 10/2003 | Chuprun ........... | H04B 7/18591 455/12.1 |

(Continued)

*Primary Examiner* — Melanie Jagannathan
(74) *Attorney, Agent, or Firm* — Guntin & Gust, PLC; Louis Yang

(57) ABSTRACT

Aspects of the subject disclosure may include, for example, obtaining first data associated with a plurality of user equipment devices that are communicating with at least one access point of a wireless terrestrial network, wherein the first data indicates a respective location of each user equipment device, a respective in-use wireless frequency that each user equipment device is using for communicating with the at least one access point, and one or more respective potential wireless frequencies that each user equipment device is capable of using for wireless communication; obtaining second data associated with a satellite access point of a wireless non-terrestrial network, wherein the second data indicates a current location of the satellite access point, a future predicted location of the satellite access point, and one or more wireless satellite frequencies that will be available for use by the satellite access point when at the future predicted location in order to communicate with one or more of the user equipment devices; and selecting, based upon the first and second data, at least one user equipment device of the plurality of user equipment devices to offload its data communication to the satellite access point. Other embodiments are disclosed.

20 Claims, 10 Drawing Sheets

(56) References Cited

U.S. PATENT DOCUMENTS

| | | | | |
|---|---|---|---|---|
| 2006/0135070 A1* | 6/2006 | Karabinis | ............. | H04H 60/51 |
| | | | | 455/67.11 |
| 2010/0048201 A1* | 2/2010 | Karabinis | ......... | H04B 7/18563 |
| | | | | 455/12.1 |
| 2011/0286437 A1* | 11/2011 | Austin | ............. | H04M 15/8271 |
| | | | | 370/338 |
| 2013/0121229 A1* | 5/2013 | Vare | ....................... | H04H 20/22 |
| | | | | 370/312 |
| 2014/0162629 A1* | 6/2014 | Tipton | ......... | H04W 36/008375 |
| | | | | 455/423 |
| 2014/0162652 A1* | 6/2014 | Kang | ................. | H04W 36/324 |
| | | | | 455/436 |
| 2017/0105146 A1* | 4/2017 | Zeng | .................... | H04W 64/00 |
| 2017/0134059 A1* | 5/2017 | Eskridge, Jr. | ....... | H04W 64/006 |
| 2018/0270621 A1* | 9/2018 | Mappus | ................ | G01S 5/0027 |
| 2019/0357061 A1* | 11/2019 | Vivanco | ................ | H04W 76/19 |
| 2020/0178135 A1* | 6/2020 | Yun | ................... | H04W 36/0061 |
| 2021/0007023 A1* | 1/2021 | Umapathy | ........ | H04W 36/0061 |
| 2021/0242935 A1* | 8/2021 | Sakhnini | ........... | H04B 7/18543 |
| 2021/0328661 A1* | 10/2021 | Qaise | .................... | H04W 84/06 |
| 2022/0021597 A1* | 1/2022 | Cui | ......................... | H04L 47/83 |
| 2022/0029700 A1* | 1/2022 | Cui | .................... | H04B 7/18563 |
| 2022/0060959 A1* | 2/2022 | Atungsiri | ........... | H04W 36/328 |
| 2022/0070749 A1* | 3/2022 | Wang | ............... | H04W 36/0085 |
| 2022/0086713 A1* | 3/2022 | Määttänen | ...... | H04W 36/00837 |
| 2022/0159535 A1* | 5/2022 | Rahman | ............ | H04W 36/0038 |
| 2023/0079636 A1* | 3/2023 | Edge | ..................... | H04W 60/04 |
| | | | | 370/316 |
| 2023/0124127 A1* | 4/2023 | Hwang | .................. | G08G 1/166 |
| | | | | 701/424 |
| 2023/0179294 A1* | 6/2023 | Kuang | .............. | H04B 7/18541 |
| | | | | 370/316 |
| 2023/0291469 A1* | 9/2023 | Billman | ............ | H04B 7/18523 |
| 2023/0354124 A1* | 11/2023 | Sambhwani | .... | H04W 36/00835 |
| 2024/0022927 A1* | 1/2024 | Tong | ....................... | H04W 4/40 |
| 2024/0030994 A1* | 1/2024 | Zhao | .................. | H04W 36/322 |
| 2024/0056925 A1* | 2/2024 | Maaref | ............ | H04W 36/0022 |
| 2024/0121661 A1* | 4/2024 | Vivanco | ........... | H04W 28/0284 |
| 2024/0146399 A1* | 5/2024 | Bhattarai | .......... | H04B 7/18521 |
| 2024/0204862 A1* | 6/2024 | Macias | .............. | H04W 36/322 |
| 2024/0204866 A1* | 6/2024 | Ciochina | ............. | H04B 7/1851 |
| 2024/0205760 A1* | 6/2024 | Huang | ............. | H04W 36/0055 |
| 2024/0381063 A1* | 11/2024 | Grau | ................. | H04W 8/005 |
| 2025/0016642 A1* | 1/2025 | Lyu | ....................... | H04W 36/32 |
| 2025/0028043 A1* | 1/2025 | Hirzallah | .................. | G01S 5/10 |
| 2025/0096886 A1* | 3/2025 | Mansour | ........... | H04B 7/18513 |
| 2025/0184845 A1* | 6/2025 | Lyu | .................... | H04W 72/231 |
| 2025/0211326 A1* | 6/2025 | Atungsiri | .......... | H04B 7/18545 |
| 2025/0294420 A1* | 9/2025 | Qiu | .................... | H04W 36/249 |
| 2025/0338343 A1* | 10/2025 | Khoshkholgh Dashtaki | ............... | |
| | | | | H04W 76/20 |
| 2025/0357999 A1* | 11/2025 | Uemura | ................ | H04W 56/00 |

* cited by examiner

Obtaining first data associated with a plurality of user equipment devices that are communicating with at least one access point of a wireless terrestrial network, wherein the first data indicates a respective location of each of the plurality of user equipment devices, a respective in-use wireless frequency that each of the plurality of user equipment devices is using for communicating with the at least one access point of the wireless terrestrial network, and one or more respective potential wireless frequencies that each of the plurality of user equipment devices is capable of using for wireless communication

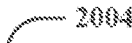

Obtaining second data associated with a first satellite access point of a wireless non-terrestrial network, wherein the second data indicates a first current location of the first satellite access point, a first future predicted location of the first satellite access point, and one or more first wireless satellite frequencies that will be available for use by the first satellite access point when at the first future predicted location in order to communicate with one or more of the plurality of user equipment devices

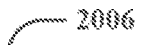

Selecting, based upon the first data and the second data, at least one user equipment device of the plurality of user equipment devices to be instructed to communicate with the first satellite access point, wherein the selecting results in at least one selected user equipment device

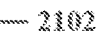

Obtaining first data associated with a first end-user device that is communicating with a terrestrial base station of a wireless terrestrial network, wherein the first data indicates a first location of the first end-user device, a first wireless frequency band that the first end-user device is using for communicating with the terrestrial base station, and one or more first additional wireless frequencies that the first end-user device is capable of using for first wireless communication

Obtaining second data associated with a second end-user device that is communicating with the terrestrial base station, wherein the second data indicates a second location of the second end-user device, a second wireless frequency band that the second end-user device is using for communicating with the terrestrial base station, and one or more second additional wireless frequencies that the second end-user device is capable of using for second wireless communication

Obtaining third data associated with a satellite base station of a wireless non-terrestrial network, wherein the third data indicates a trajectory of the satellite base station and a set of wireless frequency bands that are predicted to be available for use by the satellite base station while moving along the trajectory

Selecting, based upon the first data, the second data, and the third data, either the first end-user device or the second end-user device to be commanded to communicate with the satellite base station, wherein the selecting results in a selected end-user device

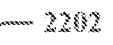

Obtaining, by a processing system including a processor, first data associated with a first satellite base station of a wireless non-terrestrial network, wherein the first data indicates a first trajectory of the first satellite base station and a first set of wireless frequency bands that are predicted to be available for use by the first satellite base station while moving along the first trajectory

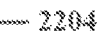

Obtaining, by the processing system, second data associated with a second satellite base station of the wireless non-terrestrial network, wherein the second data indicates a second trajectory of the second satellite base station and a second set of wireless frequency bands that are predicted to be available for use by the second satellite base station while moving along the second trajectory

Obtaining third data associated with a first end-user device that is communicating with a terrestrial base station of a wireless terrestrial network, wherein the third data indicates a first wireless frequency band that the first end-user device is using for communicating with the terrestrial base station

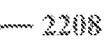

Selecting, based upon the first data, the second data, and the third data, either the first satellite base station or the second satellite base station as a selected satellite base station which is to be used to communicate with the first end-user device

Responsive to the selecting, sending a first command to the terrestrial base station, wherein: in a first case that the selected satellite base station is the first satellite base station, the first command mandates the terrestrial base station to enforce data traffic handover of the first end-user device to communicate with the first satellite base station; and in a second case that the selected satellite base station is the second satellite base station, the first command mandates the terrestrial base station to enforce data traffic handover of the first end-user device to communicate with the second satellite base station

TRAFFIC MANAGEMENT TECHNIQUES FOR HETEROGENEOUS TERRESTRIAL AND SATELLITE NETWORKS

FIELD OF THE DISCLOSURE

The subject disclosure relates to traffic management techniques for heterogeneous terrestrial and satellite networks.

BACKGROUND

A Cellular Service Provider (CSP) with a terrestrial cellular network (TN) may own a direct cellular-to-satellite non-terrestrial network (NTN) in addition to the terrestrial network. A cellular-to-satellite non-terrestrial network can create a direct connection from a customer's/subscriber's terrestrial user equipment (e.g., garden variety cellular telephone) using LTE, 5G, GSM, UMTS, 6G, or other commercially-available cellular technology. In order for such user equipment (e.g., cellular telephone) to communicate with a satellite, the satellite must use one or more frequency bands via which the user equipment is already designed to communicate (and the CSP must use either unlicensed bands or bands that are licensed to the CSP).

In operation, a satellite may be used to provide additional coverage and/or capacity to one or more terrestrial cells. A satellite may have the ability to implement one or more cells, and to operate at different frequency bands (e.g., B5, B14). A CSP (or other wireless operator) may have the ability to mandate one or more satellite cells to change frequency bands (e.g., to avoid interference with terrestrial cells, which may operate in the same frequency band(s)).

Further, a CSP may use one or more satellite cells to provide additional service capacity to specific areas at specific hours of the day (e.g., busy hour). Also, a CSP may have the ability to change the trajectory of the satellite (and/or satellite cells) and/or to schedule the trajectory of the satellite (and/or satellite cells) in such a way that the satellite/satellite cells orbit over the congested terrestrial RAN areas at their corresponding busy times.

Further still, a CSP is typically aware of the time and duration that the satellite/satellite cells will cover the congested areas. The CSP is also aware of the frequency bands used in the terrestrial cells (a CSP may use different frequency bands in different locations). The CSP is also aware (for the various terrestrial cells) of the phone capabilities and bands that they support.

However, when a terrestrial cell and a satellite cell overlap in coverage (while also operating on the same frequency band) a situation can exist in which co-channel interference and/or adjacent channel interference can be created—thus adversely affecting Signal to Interference and Noise Ratio (SINR) of both the satellite cell and the terrestrial cell (which degrades the spectral efficiency of the networks, and degrades the end user experience).

BRIEF DESCRIPTION OF THE DRAWINGS

Reference will now be made to the accompanying drawings, which are not necessarily drawn to scale, and wherein:

FIG. 2C depicts an illustrative embodiment of a method in accordance with various aspects described herein.

FIG. 2D depicts an illustrative embodiment of a method in accordance with various aspects described herein.

FIG. 2E depicts an illustrative embodiment of a method in accordance with various aspects described herein.

DETAILED DESCRIPTION

Figure 1:
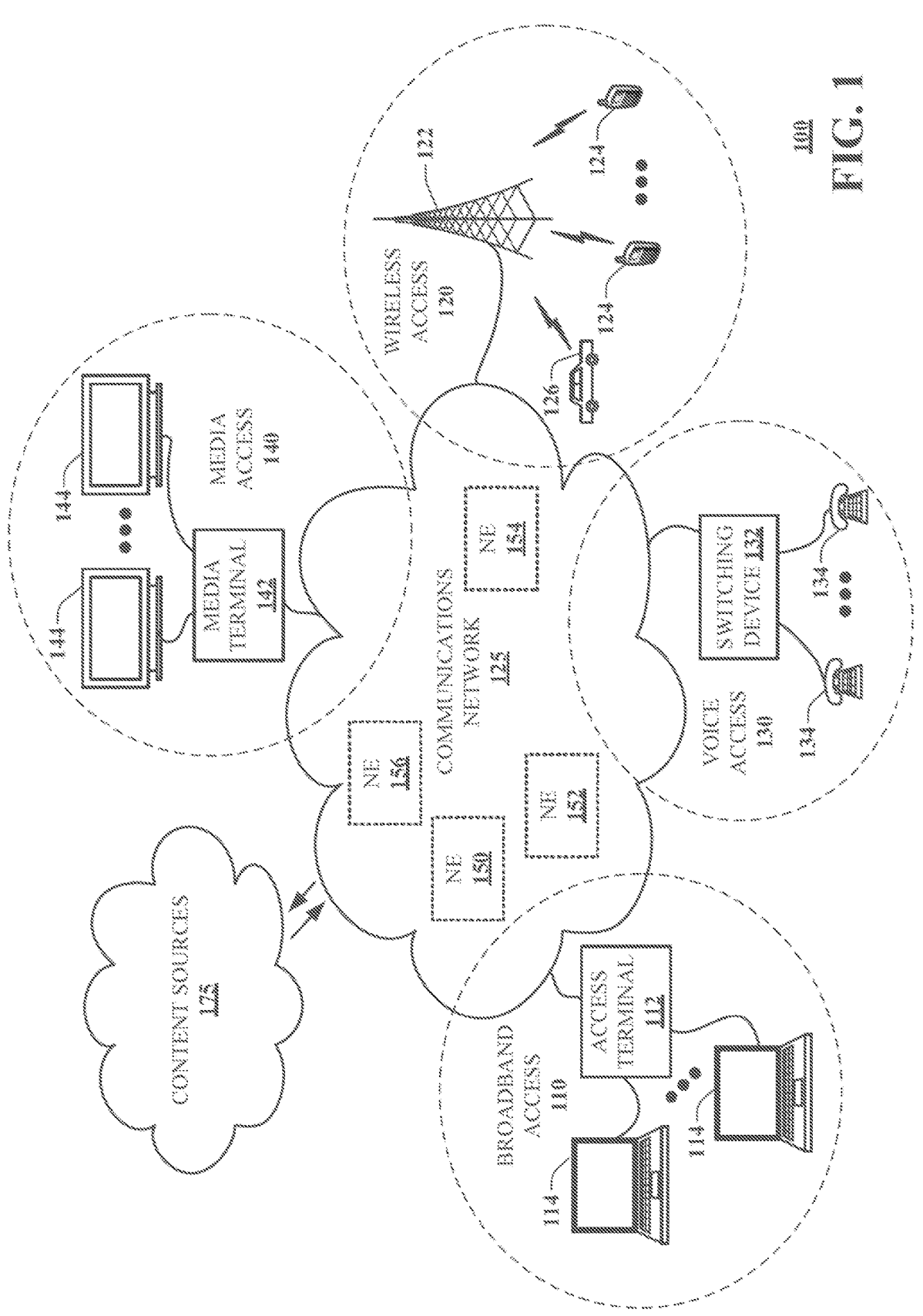
FIG. 1 is a block diagram illustrating an example, non-limiting embodiment of a communication network in accordance with various aspects described herein.

The subject disclosure describes, among other things, illustrative embodiments to implement traffic management techniques for heterogeneous terrestrial and satellite networks (e.g., 5th generation (5G) networks, 6th generation (6G) networks, and/or subsequent generation networks). Other embodiments are described in the subject disclosure.

One or more aspects of the subject disclosure include efficient traffic management for heterogeneous terrestrial and satellite networks in order to reduce (or eliminate): co-channel interference; adjacent channel interference, or any combination thereof. In various embodiments, mechanisms are provided to mandate that a terrestrial RAN instructs one or more UEs to perform handover (and/or cell-reselection) to one or more satellite cells (e.g., in order to offload traffic from one or more terrestrial cells). In various embodiments, a terrestrial RAN can add a higher priority to a satellite cell (such as by adding a higher priority to the Frequency Band that the satellite cell is using and/or by adding a higher priority to the Cell ID that the satellite cell is using).

One or more aspects of the subject disclosure include a device, comprising: a processing system including a processor; and a memory that stores executable instructions that, when executed by the processing system, facilitate performance of operations, the operations comprising: obtaining first data associated with a plurality of user equipment devices that are communicating with at least one access point of a wireless terrestrial network, wherein the first data indicates a respective location of each of the plurality of user equipment devices, a respective in-use wireless frequency that each of the plurality of user equipment devices is using for communicating with the at least one access point of the wireless terrestrial network, and one or more respective potential wireless frequencies that each of the plurality of user equipment devices is capable of using for wireless communication; obtaining second data associated with a first satellite access point of a wireless non-terrestrial network, wherein the second data indicates a first current location of the first satellite access point, a first future predicted location of the first satellite access point, and one or more first wireless satellite access point frequencies that will be available for use by the first satellite access point when at the first future predicted location in order to communicate with one or more of the plurality of user equipment devices; and selecting, based upon the first data and the second data, at least one user equipment device of the plurality of user equipment devices to be instructed to communicate with the first satellite access point instead of the at least one access point of the wireless terrestrial network, wherein the selecting results in at least one selected user equipment device.

One or more aspects of the subject disclosure include a non-transitory machine-readable medium, comprising executable instructions that, when executed by a processing system including a processor, facilitate performance of operations, the operations comprising: obtaining first data associated with a first end-user device that is communicating with a terrestrial base station of a wireless terrestrial network, wherein the first data indicates a first location of the first end-user device, a first wireless frequency band that the first end-user device is using for communicating with the terrestrial base station, and one or more first additional wireless frequencies that the first end-user device is capable of using for first wireless communication; obtaining second data associated with a second end-user device that is communicating with the terrestrial base station, wherein the second data indicates a second location of the second end-user device, a second wireless frequency band that the second end-user device is using for communicating with the terrestrial base station, and one or more second additional wireless frequencies that the second end-user device is capable of using for second wireless communication; obtaining third data associated with a satellite base station of a wireless non-terrestrial network, wherein the third data indicates a trajectory of the satellite base station and a set of wireless frequency bands that are predicted to be available for use by the satellite base station while moving along the trajectory; and selecting, based upon the first data, the second data, and the third data, either the first end-user device or the second end-user device to be commanded to communicate with the satellite base station, wherein the selecting results in a selected end-user device.

One or more aspects of the subject disclosure include a method, comprising: obtaining, by a processing system including a processor, first data associated with a first satellite base station of a wireless non-terrestrial network, wherein the first data indicates a first trajectory of the first satellite base station and a first set of wireless frequency bands that are predicted to be available for use by the first satellite base station while moving along the first trajectory; obtaining, by the processing system, second data associated with a second satellite base station of the wireless non-terrestrial network, wherein the second data indicates a second trajectory of the second satellite base station and a second set of wireless frequency bands that are predicted to be available for use by the second satellite base station while moving along the second trajectory; obtaining third data associated with a first end-user device that is communicating with a terrestrial base station of a wireless terrestrial network, wherein the third data indicates a first wireless frequency band that the first end-user device is using for communicating with the terrestrial base station; selecting, based upon the first data, the second data, and the third data, either the first satellite base station or the second satellite base station as a selected satellite base station which is to be used to communicate with the first end-user device; and responsive to the selecting, sending a first command to the terrestrial base station, wherein: in a first case that the selected satellite base station is the first satellite base station, the first command mandates the terrestrial base station to enforce data traffic handover of the first end-user device to communicate with the first satellite base station; and in a second case that the selected satellite base station is the second satellite base station, the first command mandates the terrestrial base station to enforce data traffic handover of the first end-user device to communicate with the second satellite base station.

Referring now to FIG. 1, a block diagram is shown illustrating an example, non-limiting embodiment of a system 100 in accordance with various aspects described herein. For example, system 100 can facilitate in whole or in part traffic management techniques for heterogeneous terrestrial and satellite networks. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

As described herein, various embodiments can provide a mechanism to facilitate traffic management for heterogeneous terrestrial and satellite networks to reduce (or eliminate) co-channel interference and/or adjacent channel interference. In one embodiment, the mechanism to facilitate the traffic management can comprise one or more algorithms. In various embodiments, the one or more algorithms to facilitate traffic management can reside at the network, at the RAN, behind the eNB (e.g., at the SON, at the RIC), or any combination thereof. In various embodiments, the mechanism to facilitate traffic management can collect information comprising: (a) satellite trajectory; (b) terrestrial RAN utilization; (c) terrestrial RAN frequency band configuration; (d) terrestrial RAN coverage; (e) UE capabilities; (f) UE frequency band capabilities; or (g) any combination thereof. In various embodiments, the mechanism to facilitate traffic management can utilize the collected information to identify: (a) one or more frequency bands that satellite cell(s) can be tuned to in order to minimize (or avoid) interference with terrestrial cell(s); (b) a number of UEs that can support connection with satellite cell(s) at the proposed frequency band(s)—and that can thus be offloaded from terrestrial cell(s) to satellite cell(s)); (c) an estimate of the load reduction (resulting from the offloading of traffic to satellite cell(s)) that the terrestrial cell(s) would experience; (d) or any combination thereof. In various embodiments, the mechanism to facilitate traffic management can (e.g., as a result of the estimates) mandate a terrestrial RAN to instruct some UEs to perform handover (HO) and/or cell-reselection to one or more satellite cells (these instructions can thus cause an offloading of traffic from the terrestrial cell(s)). In various embodiments, the terrestrial RAN can add higher priorities to satellite cells (e.g., by adding higher priority to the frequency band(s) and/or to the Cell ID(s) that the satellite cell(s) are using).

Figure 2A:
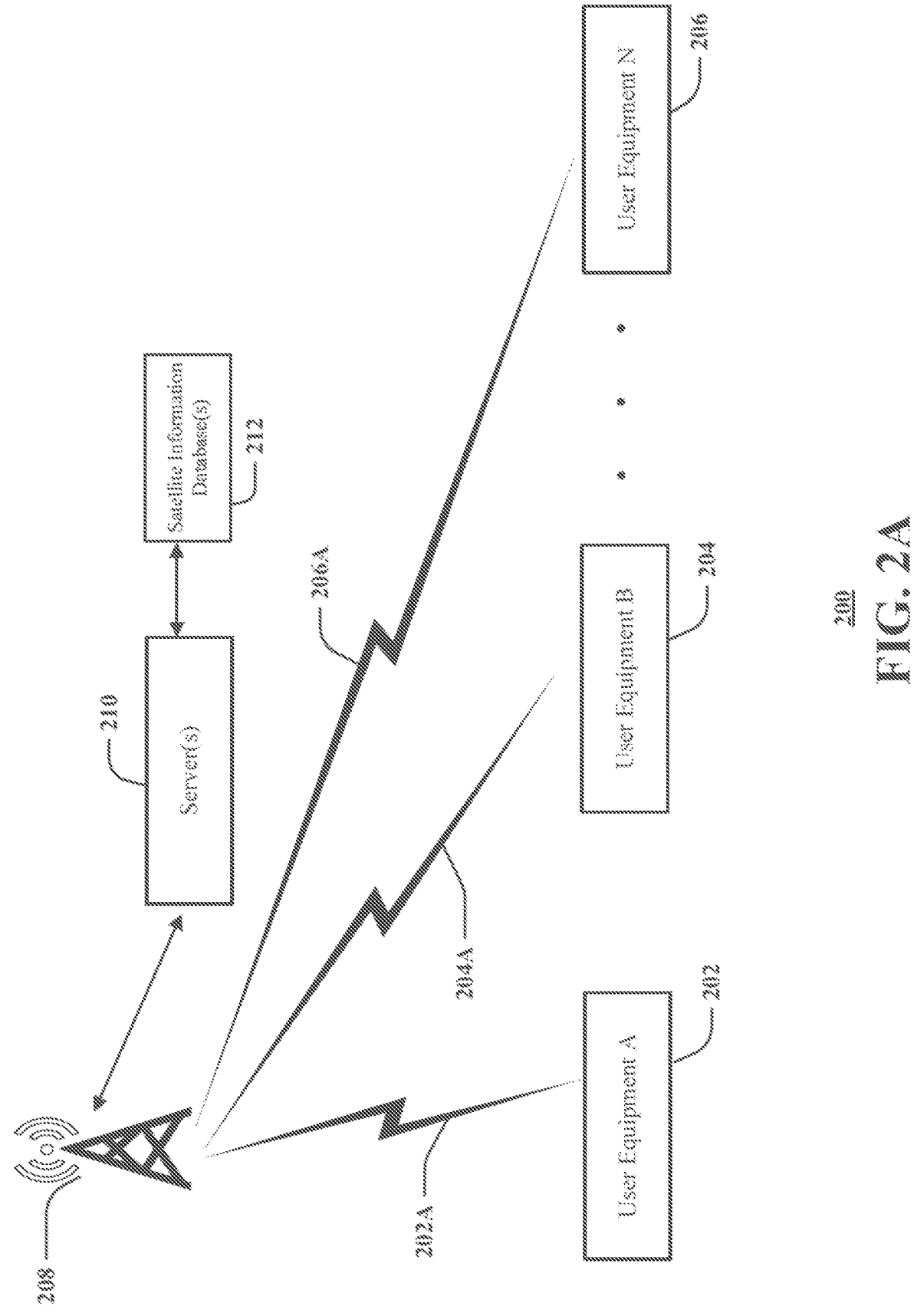
FIGS. 2A and 2B are block diagrams illustrating an example, non-limiting embodiment of a system (which can function fully or partially within the communication network of FIG. 1) in accordance with various aspects described herein.
Figure 2B:
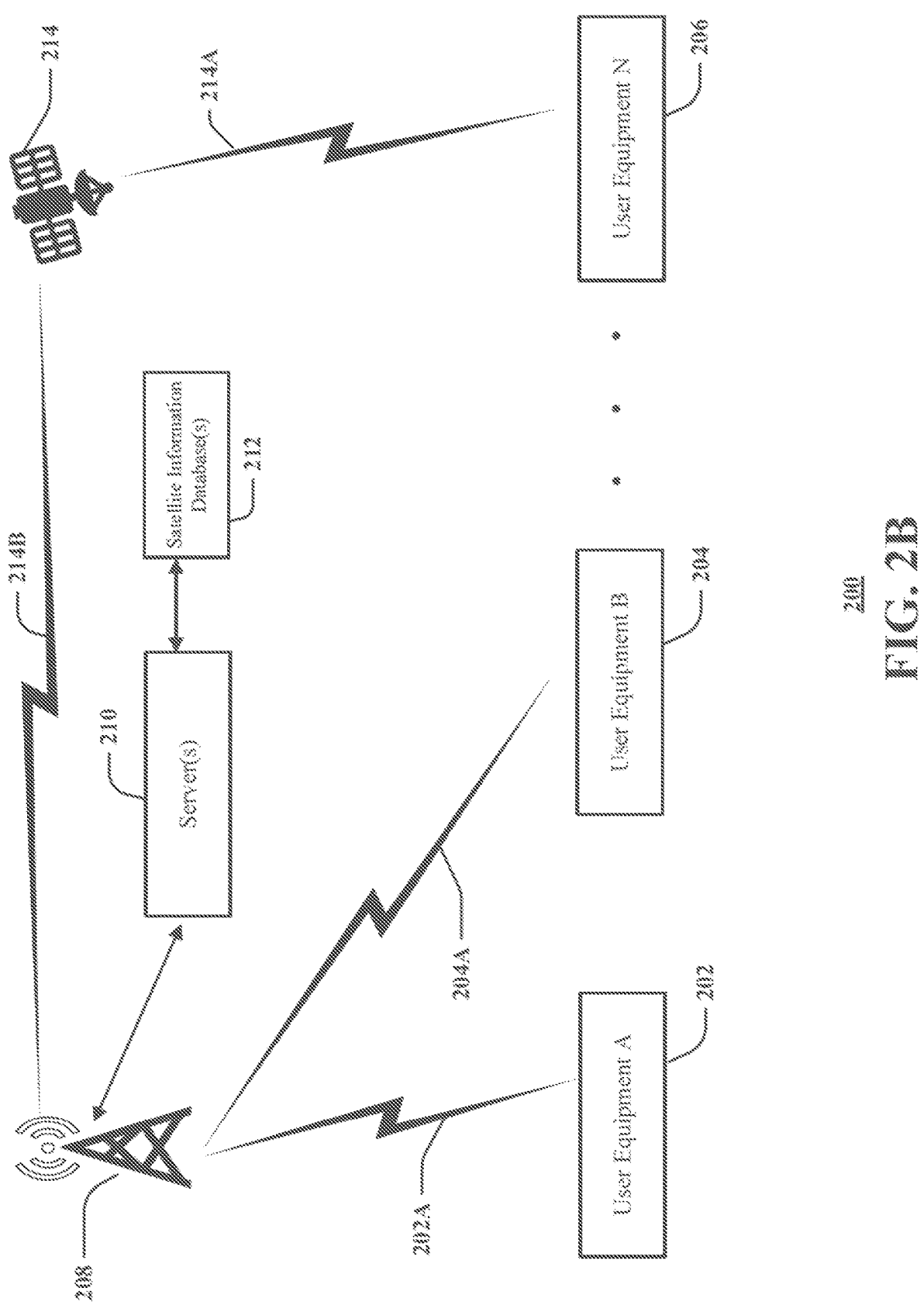

Referring now to FIGS. 2A and 2B, these are block diagrams illustrating an example, non-limiting embodiment of a system 200 (which can function fully or partially within the communication network of FIG. 1) in accordance with various aspects described herein. As seen in FIG. 2A, the system 200 is in a state wherein User Equipment A (element 202), User Equipment B (element 204), and User Equipment N (element 206) are in bi-directional wireless communications (see respective communication channels 202A, 204A, 206A) with Terrestrial Base Station 208. Further, Terrestrial Base Station 208 is in bi-directional communications with Server(s) 210 (which, in turn, are in bi-directional communications with Satellite Information Database(s) 212). In various examples, the Server(s) 210 can be part of Terrestrial Base Station 208 and/or separate from Terrestrial Base Station 208. In various examples, the Satellite Information Database(s) 212 can be part of Server(s) 210 and/or separate from Server(s) 210. The Server(s) 210 can comprise hardware, firmware, and/or software that implement various algorithms to carry out traffic management techniques for heterogeneous terrestrial and satellite networks as described herein. The Satellite Information Database(s) 212 can comprise data (e.g., satellite trajectory data, satellite frequency band data) that facilitates traffic management techniques for heterogeneous terrestrial and satellite networks as described herein. In various examples, each of User Equipment A, User Equipment B, and User Equipment N can comprise: a smartphone; a cellphone; a tablet computer; a laptop computer; a notebook computer; or any combination thereof. Of course, while three pieces of user equipment are shown in these FIGS. 2A and 2B, any desired number of pieces of user equipment can be supported. Also, while one Terrestrial Base Station is shown in these FIGS. 2A and 2B, any desired number of Terrestrial Base Stations can be supported. In FIG. 2A, it is seen that at the moment in time depicted, no satellite is overhead (e.g., there is no satellite in line-of-sight view relative to the pieces of user equipment and the base station). In contrast, in FIG. 2B, satellite 214 has come into view (of course, while one satellite is shown in FIG. 2B, any desired number of satellites can be supported).

Referring now in particular to FIG. 2A, at the moment in time shown in this figure, there is no satellite overhead and thus each of User Equipment A (element 202), User Equipment B (element 204), and User Equipment N (element 206) is in bi-directional wireless communications with Terrestrial Base Station 208. The Server(s) 210 do, however, have access to data in the Satellite Information Database(s) that specifics trajectories for each satellite in a satellite constellation as well as wireless frequency band communication capabilities for each of the satellites in the satellite constellation. In addition, the Server(s) 210 have access to data (that can be internally stored and/or externally stored) that specifies for each piece of user equipment respective wireless frequency band communication capabilities as well as respective location data (which location data can include historical locations, current locations, and/or predicted future locations). Based upon the data available to the Server(s) 210, the Server(s) 210 make a determination (and/or prediction) as to which one or more of the pieces of user equipment will be instructed to communicate with a satellite (e.g., instead of with Terrestrial Base Station 208 or in combination with Terrestrial Base Station 208).

Referring now in particular to FIG. 2B, at the moment in time shown in this figure, there is now Satellite 214 overhead. Further, based upon the process described above, User Equipment N (element 206) has been instructed to start communicating with Satellite 214 (see bi-directional wireless communication channel 214A). In addition, there is a bi-directional wireless communication channel 214B, via which the Terrestrial Base Station 208 can communicate with Satellite 214 (e.g., to send to the satellite instructions to communicate with User Equipment N (element 206), to send/receive user data through Satellite 214). Although not shown in FIG. 2B, at a different time User Equipment N (element 206) can be instructed to communicate with another (different) satellite and/or with Terrestrial Base Station 208.

Sill referring to FIGS. 2A and 2B, it is noted that in some embodiments, a piece of user equipment can entirely cease communications with Terrestrial Base Station 208 when instead communicating with satellite 214. In other embodiments, a piece of user equipment can maintain some communications with Terrestrial Base Station 208 when communicating with Satellite 214 (for example, a piece of user equipment can maintain control-type communications with a terrestrial base station while engaging in user-data-type communications with a satellite).

In various embodiments, determinations as to which one (or more) pieces of user equipment to instruct to engage in satellite communications and which one (or more) pieces of user equipment to instruct to engage in terrestrial communications can be based upon: historical location of each piece of user equipment; current location of each piece of user equipment; future (predicted) location of each piece of user equipment; historical velocity/movement direction of each piece of user equipment; current velocity/movement direction of each piece of user equipment; future (predicted) velocity/movement direction of each piece of user equipment; location of each base station; historical location of each satellite; current location of each satellite; future (predicted) location of each satellite; historical frequency band capability and/or capacity of each piece of user equipment; current frequency band capability and/or capacity of each piece of user equipment; future (predicted) frequency band capability and/or capacity of each piece of user equipment; historical frequency band capability and/or capacity of each satellite; current frequency band capability and/or capacity of each satellite; future (predicted) frequency band capability and/or capacity of each satellite; historical frequency band capability and/or capacity of each base station; current frequency band capability and/or capacity of each base station; future (predicted) frequency band capability and/or capacity of each base station; a busy communications time period; a not busy communications time period; a level of communications congestion at a given time of day; a level of communications congestion at a given day of week; a level of communications congestion at a given holiday period; a level of communications congestion at a given non-holiday period; a number of pieces of user equipment in simultaneous use; a number of satellites in simultaneous use; a number of base stations in simultaneous use; or any combination thereof.

In various embodiments, determinations as to which one (or more) pieces of user equipment to instruct to engage in satellite communications and which one (or more) pieces of user equipment to instruct to engage in terrestrial communications can be made in order to optimize resources of the terrestrial base station(s).

Referring now to FIG. 2C, various steps of a method 2000 according to an embodiment are shown. As seen in this FIG. 2C, step 2002 comprises obtaining first data associated with a plurality of user equipment devices that are communicating with at least one access point of a wireless terrestrial network, wherein the first data indicates a respective location of each of the plurality of user equipment devices, a respective in-use wireless frequency that each of the plurality of user equipment devices is using for communicating with the at least one access point of the wireless terrestrial network, and one or more respective potential wireless frequencies that each of the plurality of user equipment devices is capable of using for wireless communication. Next, step 2004 comprises obtaining second data associated with a first satellite access point of a wireless non-terrestrial network, wherein the second data indicates a first current location of the first satellite access point, a first future predicted location of the first satellite access point, and one or more first wireless satellite access point frequencies that will be available for use by the first satellite access point when at the first future predicted location in order to communicate with one or more of the plurality of user equipment devices. Next, step 2006 comprises selecting, based upon the first data and the second data, at least one user equipment device of the plurality of user equipment devices to be instructed to communicate with the first satellite access point, wherein the selecting results in at least one selected user equipment device.

In various embodiments, each user equipment device is capable of transmitting and receiving data through the wireless terrestrial network, through the wireless non-terrestrial network, or through any combination thereof. In various embodiments, the wireless terrestrial network and/or the wireless non-terrestrial network are able to enforce data traffic handover of an attached user equipment device to each other.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2D, various steps of a method 2100 according to an embodiment are shown. As seen in this FIG. 2D, step 2102 comprises obtaining first data associated with a first end-user device that is communicating with a terrestrial base station of a wireless terrestrial network, wherein the first data indicates a first location of the first end-user device, a first wireless frequency band that the first end-user device is using for communicating with the terrestrial base station, and one or more first additional wireless frequencies that the first end-user device is capable of using for first wireless communication. Next, step 2104 comprises obtaining second data associated with a second end-user device that is communicating with the terrestrial base station, wherein the second data indicates a second location of the second end-user device, a second wireless frequency band that the second end-user device is using for communicating with the terrestrial base station, and one or more second additional wireless frequencies that the second end-user device is capable of using for second wireless communication. Next, step 2106 comprises obtaining third data associated with a satellite base station of a wireless non-terrestrial network, wherein the third data indicates a trajectory of the satellite base station and a set of wireless frequency bands that are predicted to be available for use by the satellite base station while moving along the trajectory. Next, step 2108 comprises selecting, based upon the first data, the second data, and the third data, either the first end-user device or the second end-user device to be commanded to communicate with the satellite base station, wherein the selecting results in a selected end-user device.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2E, various steps of a method 2200 according to an embodiment are shown. As seen in this FIG. 2E, step 2202 comprises obtaining, by a processing system including a processor, first data associated with a first satellite base station of a wireless non-terrestrial network, wherein the first data indicates a first trajectory of the first satellite base station and a first set of wireless frequency bands that are predicted to be available for use by the first satellite base station while moving along the first trajectory. Next, step 2204 comprises obtaining, by the processing system, second data associated with a second satellite base station of the wireless non-terrestrial network, wherein the second data indicates a second trajectory of the second satellite base station and a second set of wireless frequency bands that are predicted to be available for use by the second satellite base station while moving along the second trajectory. Next, step 2206 comprises obtaining third data associated with a first end-user device that is communicating with a terrestrial base station of a wireless terrestrial network, wherein the third data indicates a first wireless frequency band that the first end-user device is using for communicating with the terrestrial base station. Next, step 2208 comprises selecting, based upon the first data, the second data, and the third data, either the first satellite base station or the second satellite base station as a selected satellite base station which is to be used to communicate with the first end-user device. Next, step 2210 comprises responsive to the selecting, sending a first command to the terrestrial base station, wherein: in a first case that the selected satellite base station is the first satellite base station, the first command mandates the terrestrial base station to enforce data traffic handover of the first end-user device to communicate with the first satellite base station; and in a second case that the selected satellite base station is the second satellite base station, the first command mandates the terrestrial base station to enforce data traffic handover of the first end-user device to communicate with the second satellite base station.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide traffic management techniques for heterogeneous terrestrial and satellite networks (e.g., 5G network(s), 6G network(s), and/or any subsequent generation of network(s).

As described herein, various embodiments provide a traffic management solution for heterogeneous terrestrial and satellite networks to reduce (or eliminate): Co-channel interference; Adjacent channel interference; or any combination thereof.

As described herein, various embodiments provide a traffic management solution for heterogeneous terrestrial and satellite networks in which various algorithms, computer-implemented instructions, and the like reside: (a) at the network; (b) at the RAN; (c) behind the eNB (e.g., SON, RIC); or (d) any combination thereof. In various embodiments, the traffic management can be based at least in part upon information comprising: (a) Satellite Trajectory; (b) Terrestrial RAN Utilization; (c) Terrestrial RAN Frequency Band Configuration; (d) Terrestrial RAN Coverage; (e) UE capability; (f) UE Frequency Band capabilities. In various embodiments, with such collected information, one or more algorithms can mandate an intelligent traffic offloading mechanism (e.g., to offload traffic from one or more terrestrial cells to one or more satellite cells (and to receive back such traffic as appropriate)).

As described herein, various embodiments can mandate that the satellite cell(s) tune to different frequency band(s) while orbiting over different terrestrial RAN locations (e.g., based on supported frequency bands and UE capabilities). In one specific example, if extra capacity from satellite cell(s) is not needed in a given area, a corresponding satellite cell can be instructed to be powered down.

As described herein, various embodiments provide traffic management techniques for heterogeneous terrestrial and satellite 5G networks (e.g., comprising cellular base stations and low-earth orbit satellites). In various examples, the traffic management can operate to reduce or eliminate adjacent channel interference.

As described herein, various embodiments can place the decision-making intelligence (e.g., algorithm(s)) on the base station(s) and/or the user devices (e.g., smartphones).

As described herein, various embodiments can facilitate handovers from base station to satellite and back (wherein the handovers can be essentially seamless).

As described herein, various embodiments can facilitate handovers from base station to satellite and back (wherein a particular end user device receives essentially the same bandwidth and/or communications capability).

As described herein, various embodiments can facilitate handovers from base station to satellite and back in order to provide extra coverage and/or extra capacity. In one specific example, handover to a satellite can provide coverage in an area (e.g., a forest, a desert) that would otherwise not have terrestrial coverage. In another specific example, extra capacity can be provided for a busy time (e.g., busy hour(s) in a particular location).

As described herein, various embodiments can facilitate handovers from base station to satellite and back in order to provide coverage and/or capacity for one or more emergencies.

As described herein, various embodiments can operate such as to make decisions to avoid (or minimize) use of a satellite frequency or band that would overlap with one or more frequencies or bands that are being used by the terrestrial base station(s)—thus avoiding (or minimizing) co-channel/adjacent channel interference. In one example, the decisions can be made based upon data resulting from a scan of frequencies being used by the end user equipment devices in a vicinity of the terrestrial base station(s). In one example, if the terrestrial network is using frequencies F1, F2, F3, a satellite will be directed to use F4. In one example, the decisions can be based upon satellite trajectory data—e.g., where and when a satellite is scheduled to pass overhead (for example, scheduled to pass over a specific city at a specific time with a specific coverage). In one example, the decisions can be based upon communication frequency capabilities of one or more end user devices (the end user device communication frequency capabilities can be known, for example, because those end user devices had already been registered on the terrestrial system as part of the initial signaling setup as the phone registers on the network).

As described herein, various embodiments can operate such as to utilize a microwave link (e.g., uplink, and/or downlink) between a terrestrial base station (and then the core network) and a satellite for communication between the two (e.g., for signaling, for carrying user data).

As described herein, various embodiments can operate such as to implement beam steering by the satellite (e.g., in order to provide coverage/extra capacity to a given location/ area on the ground). In one specific example, the beam steering can be to provide a communication channel (e.g., a service link) between each end user device and the respective satellite.

As described herein, various embodiments can facilitate offloading some traffic from the terrestrial network without creating interference.

As described herein, various embodiments can utilize algorithm(s) and/or intelligence that reside in the network (e.g., in the terrestrial network). In various examples, the algorithm(s) and/or intelligence can reside in the RAN, behind the eNodeB, and/or in a Self-Organized Network.

As described herein, in various embodiments a satellite can implement in essence one or more software defined cells which can dynamically change (or tune) to different frequencies via software. Such satellites can be frequency agile in real-time (or almost real-time, such as on the order of a few minute response).

As described herein, in various embodiments a mechanism is provided to predict what frequencies are needed at a given time and a given place.

As described herein, in various embodiments a mechanism can provide coverage in an area that loses capacity (e.g., due to a storm, due to a hurricane, due to a disaster).

As described herein, in various embodiments a decision-making process can be as follows: (a) Is extra capacity needed (yes or no)? (b) If extra capacity is needed, determine what frequencies are currently being used (e.g., by end user devices) and what frequencies are capable of being used (e.g., can be attached to by end user devices). (c) Select for the extra capacity frequencies that are not being used but that are capable of being used. (d) Estimate/determine how much traffic should be offloaded to alleviate congestion on the terrestrial network (without overloading the satellite network). In one example, load balancing can target a certain percentage on the terrestrial network and a certain percentage on the satellite network.

As described herein, in various embodiments a decision-making process can take into account a particular end-user's subscription/plan level (e.g., a subscriber paying a higher amount can receive priority).

As described herein, in various embodiments a decision-making process can take into account a particular class of UE, a particular class of subscriber/customer (e.g., FirstNet will get offloaded to satellite first), a particular quality of service (QoS), a particular PLMN (public land mobile network).

As described herein, in various embodiments a mechanism can provide a prediction of what frequencies will be available and what frequencies can be used to fill capacity gaps.

As described herein, various embodiments can operate in the context of any wireless operator that uses heterogeneous terrestrial and satellite networks to service their customers.

Figure 3:
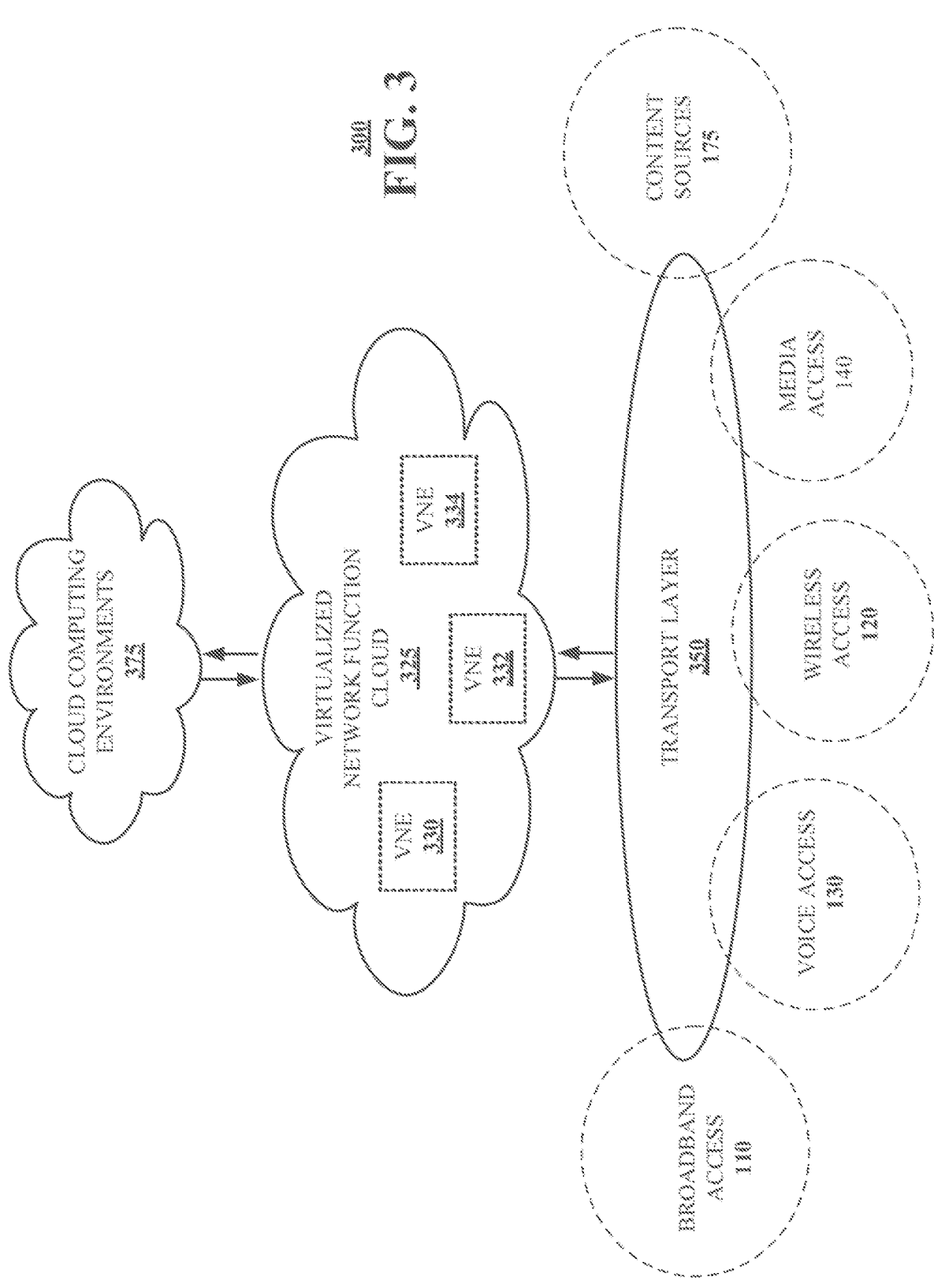
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 200, and/or some or all of the functions of methods 2000, 2100, 2200. For example, virtualized communication network 300 can facilitate in whole or in part traffic management techniques for heterogeneous terrestrial and satellite networks.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
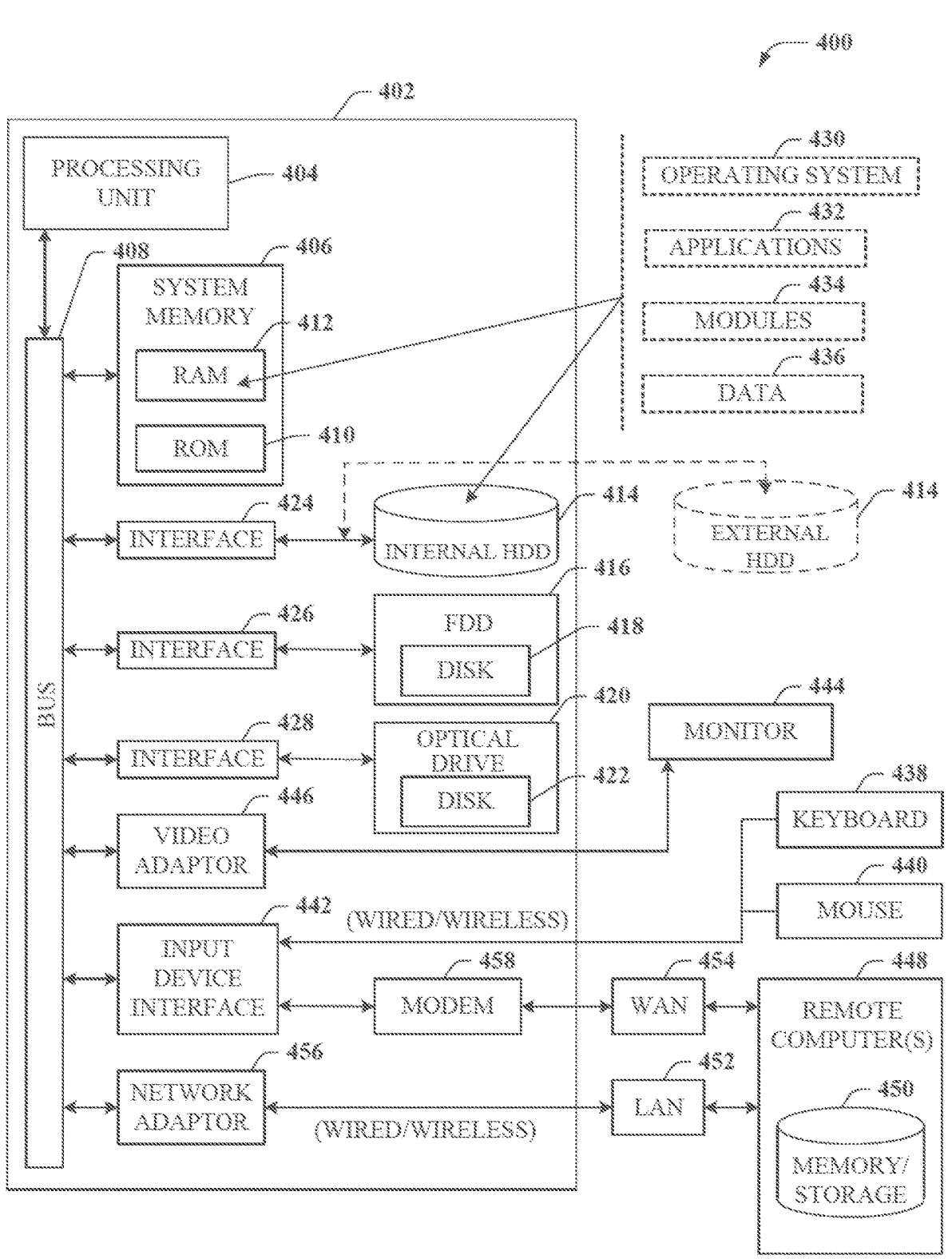
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part traffic management techniques for heterogeneous terrestrial and satellite networks.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
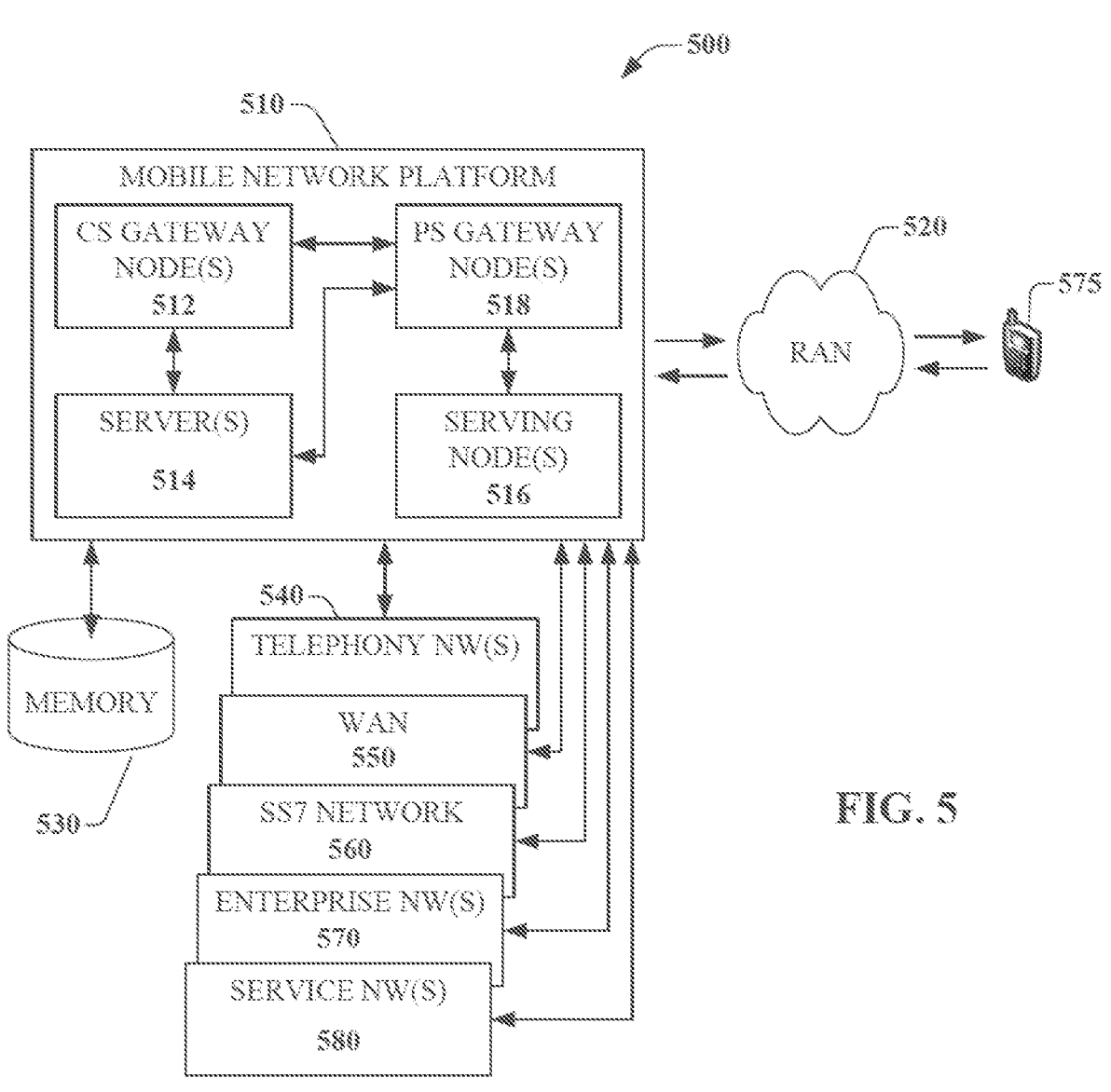
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part traffic management techniques for heterogeneous terrestrial and satellite networks. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
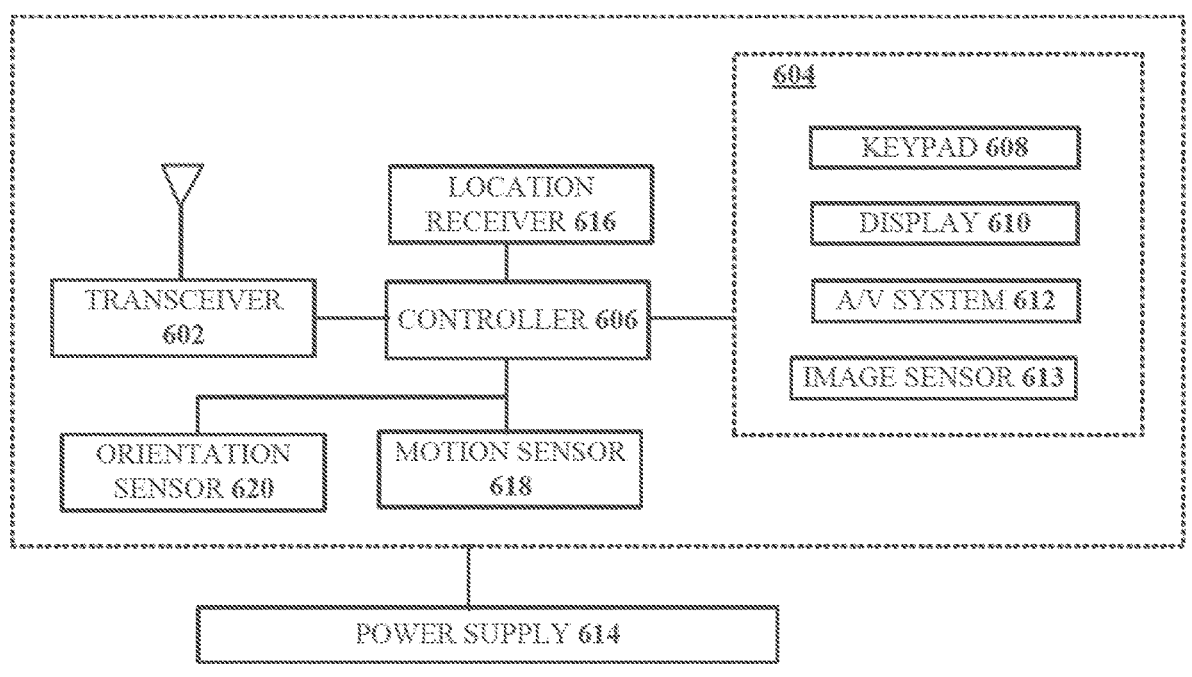
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part traffic management techniques for heterogeneous terrestrial and satellite networks.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically managing heterogeneous terrestrial and satellite networks) can employ various AI-based schemes for carrying out various embodiments thereof. Moreover, the classifier can be employed to determine a ranking or priority of each terrestrial network, each base station, each access point, each satellite network, each satellite, and/or each piece of user equipment. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the terrestrial network(s), base station(s), access point(s), satellite network(s), satellite(s), and/or piece(s) of user equipment is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

obtaining first data associated with a plurality of user equipment devices that are communicating with at least one access point of a wireless terrestrial network, wherein the first data indicates a respective location of each of the plurality of user equipment devices, a respective in-use wireless frequency that each of the plurality of user equipment devices is using for communicating with the at least one access point of the wireless terrestrial network, and one or more respective potential wireless frequencies that each of the plurality of user equipment devices is capable of using for wireless communication;

obtaining second data associated with a first satellite access point of a wireless non-terrestrial network, wherein the second data indicates a first current location of the first satellite access point, a first future predicted location of the first satellite access point, and one or more first wireless satellite access point frequencies that will be available for use by the first satellite access point when at the first future predicted location in order to communicate with one or more of the plurality of user equipment devices; and selecting, based upon the first data and the second data, at least one user equipment device of the plurality of user equipment devices to be instructed to communicate with the first satellite access point, wherein the selecting results in at least one selected user equipment device.

2. The device of claim 1, wherein:

the operations further comprise: responsive to the selecting, sending a command to the at least one access point of the wireless terrestrial network, wherein the command mandates the at least one access point of the wireless terrestrial network to enforce data traffic handover of the at least one selected user equipment device, which is currently connected to the at least one access point of the wireless terrestrial network, to the first satellite access point; and a decision of enforcing the data traffic handover of the at least one selected user equipment device from the at least one access point of the wireless terrestrial network to the first satellite access point is to alleviate a capacity overload condition of the at least one access point of the wireless terrestrial network.

3. The device of claim 2, wherein:

the command causes the at least one selected user equipment device to stop at least some communications with the at least one access point of the wireless terrestrial network and to re-direct the at least some communications to the first satellite access point when the first satellite access point is at the first future predicted location; and a wireless coverage of the first satellite access point overlaps partially with a wireless coverage of the at least one access point of the wireless terrestrial network.

4. The device of claim 3, wherein the operations further comprise determining, based upon the first data and the second data, a determined time at which the at least one selected user equipment device is to stop communicating with the first satellite access point and to re-direct the at least some communications to the at least one access point of the wireless terrestrial network.

5. The device of claim 4, wherein the operations further comprise:

responsive to the determining, sending another command to the at least one access point of the wireless terrestrial network, wherein the another command mandates the at least one access point of the wireless terrestrial network to enforce another data traffic handover of the selected user equipment device to again communicate the at least some communications at the determined time with the at least one access point of the wireless terrestrial network and to stop communicating at the determined time with the first satellite access point.

6. The device of claim 1, wherein the operations further comprise:

obtaining third data associated with a second satellite access point of the wireless non-terrestrial network, wherein the third data indicates a second current location of the second satellite access point, a second future predicted location of the second satellite access point, and one or more second wireless satellite access point frequencies that will be available for use by the second satellite access point when at the second future predicted location in order to communicate with one or more of the plurality of user equipment devices; and selecting, based upon the first data and the third data, at least one other user equipment device of the plurality of user equipment devices to be instructed to communicate with the second satellite access point, wherein the selecting of the at least one other user equipment device results in at least one other selected user equipment device.

7. The device of claim 6, wherein:

the operations further comprise: responsive to the selecting of the at least one other user equipment device, sending a command to the at least one access point of the wireless terrestrial network, wherein the command mandates the at least one access point of the wireless terrestrial network to enforce data traffic handover of the at least one other selected user equipment device, which is currently connected to the at least one access point of the wireless terrestrial network, to a second satellite access point; and a decision of enforcing the data traffic handover of the at least one other selected user equipment device from the at least one access point of the wireless terrestrial network to the second satellite access point is to alleviate a capacity overload condition of the at least one access point of the wireless terrestrial network.

8. The device of claim 7, wherein:

the command causes the at least one other selected user equipment device to stop at least some communications with the at least one access point of the wireless terrestrial network and to re-direct the at least some communications to the second satellite access point when the second satellite access point is at the second future predicted location; and a wireless coverage of the second satellite access point overlaps partially with a wireless coverage of the at least one access point of the wireless terrestrial network.

9. The device of claim 1, wherein the first data comprises data that has been transmitted by each of the plurality of user equipment devices.

10. The device of claim 1, wherein the at least one access point of the wireless terrestrial network comprises a plurality of access points.

11. The device of claim 10, wherein each of the plurality of access points of the wireless terrestrial network comprises a respective cellular base station.

12. The device of claim 10, wherein:

the plurality of user equipment devices comprises a first user equipment device and a second user equipment device;

the at least one access point of the wireless terrestrial network comprises a first access point and a second access point;

the first user equipment device is communicating, prior to the selecting, with the first access point; and the second user equipment device is communicating, prior to the selecting, with the second access point.

13. The device of claim 1, wherein the one or more respective potential wireless frequencies that each of the plurality of user equipment devices is capable of using for wireless communication comprises one or more wireless frequencies that can be used to communicate with the wireless terrestrial network and with the wireless non-terrestrial network.

14. The device of claim 1, wherein the wireless terrestrial network comprises a fifth generation (5G) cellular network, a sixth generation (6G) cellular network, a subsequent generation cellular network, or any combination thereof.

15. The device of claim 1, wherein each of the plurality of user equipment devices comprises a respective mobile device, a respective smartphone, a respective cellphone, a respective laptop computer, a respective notebook computer, a respective tablet, or any respective combination thereof.

16. The device of claim 1, wherein the first future predicted location of the first satellite access point provides communication coverage over a communication area of the wireless terrestrial network.

17. A non-transitory machine-readable medium, comprising executable instructions that, when executed by a processing system including a processor, facilitate performance of operations, the operations comprising:

obtaining first data associated with a first end-user device that is communicating with a terrestrial base station of a wireless terrestrial network, wherein the first data indicates a first location of the first end-user device, a first wireless frequency band that the first end-user device is using for communicating with the terrestrial base station, and one or more first additional wireless frequencies that the first end-user device is capable of using for first wireless communication;

obtaining second data associated with a second end-user device that is communicating with the terrestrial base station, wherein the second data indicates a second location of the second end-user device, a second wireless frequency band that the second end-user device is using for communicating with the terrestrial base station, and one or more second additional wireless frequencies that the second end-user device is capable of using for second wireless communication;

obtaining third data associated with a satellite base station of a wireless non-terrestrial network, wherein the third data indicates a trajectory of the satellite base station and a set of wireless frequency bands that are predicted to be available for use by the satellite base station while moving along the trajectory; and selecting, based upon the first data, the second data, and the third data, either the first end-user device or the second end-user device to be commanded to communicate with the satellite base station, wherein the selecting results in a selected end-user device.

18. The non-transitory machine-readable medium of claim 17, wherein:

the trajectory comprises a current position of the satellite base station and one or more future positions of the satellite base station;

the one or more future positions of the satellite base station cover a geographic area in which the terrestrial base station is providing wireless service;

being commanded to communicate with the satellite base station comprises being commanded to communicate with the satellite base station instead of the terrestrial base station;

in a first case that the first end-user device is the selected end-user device, at least one of the first wireless frequency band or the one or more first additional wireless frequencies at least partially overlaps the set of wireless frequency bands that are predicted to be available for use by the satellite base station; and in a second case that the second end-user device is the selected end-user device, at least one of the second wireless frequency band or the one or more second additional wireless frequencies at least partially overlaps the set of wireless frequency bands that are predicted to be available for use by the satellite base station.

19. A method, comprising:

obtaining, by a processing system including a processor, first data associated with a first satellite base station of a wireless non-terrestrial network, wherein the first data indicates a first trajectory of the first satellite base station and a first set of wireless frequency bands that are predicted to be available for use by the first satellite base station while moving along the first trajectory;

obtaining, by the processing system, second data associated with a second satellite base station of the wireless non-terrestrial network, wherein the second data indicates a second trajectory of the second satellite base station and a second set of wireless frequency bands that are predicted to be available for use by the second satellite base station while moving along the second trajectory;

obtaining third data associated with a first end-user device that is communicating with a terrestrial base station of a wireless terrestrial network, wherein the third data indicates a first wireless frequency band that the first end-user device is using for communicating with the terrestrial base station;

selecting, based upon the first data, the second data, and the third data, either the first satellite base station or the second satellite base station as a selected satellite base station which is to be used to communicate with the first end-user device; and responsive to the selecting, sending a first command to the terrestrial base station, wherein:

in a first case that the selected satellite base station is the first satellite base station, the first command mandates the terrestrial base station to enforce data traffic handover of the first end-user device to communicate with the first satellite base station; and in a second case that the selected satellite base station is the second satellite base station, the first command mandates the terrestrial base station to enforce data traffic handover of the first end-user device to communicate with the second satellite base station.

20. The method of claim 19, further comprising:

obtaining, by the processing system, fourth data associated with a second end-user device that is communicating with the terrestrial base station, wherein the fourth data indicates a second wireless frequency band that the second end-user device is using for communicating with the terrestrial base station;

selecting, based upon the first data, the second data, and the fourth data, either the first satellite base station or the second satellite base station as another selected satellite base station which is to be used to communicate with the second end-user device; and responsive to the selecting of either the first satellite base station or the second satellite base station as the another selected satellite base station, sending a second command to the terrestrial base station, wherein:

in a third case that the another selected satellite base station is the first satellite base station, the second command mandates the terrestrial base station to enforce data traffic handover of the second end-user device to communicate with the first satellite base station; and in a fourth case that the another selected satellite base station is the second satellite base station, the second command mandates the terrestrial base station to enforce data traffic handover of the second end-user device to communicate with the second satellite base station.

* * * * *